United States Patent [19]
Ebrahim

[11] Patent Number: 5,878,264
[45] Date of Patent: Mar. 2, 1999

[54] POWER SEQUENCE CONTROLLER WITH WAKEUP LOGIC FOR ENABLING A WAKEUP INTERRUPT HANDLER PROCEDURE

[75] Inventor: Zahir Ebrahim, Mountain View, Calif.

[73] Assignee: Sun Microsystems, Inc., Mountain View, Calif.

[21] Appl. No.: 895,947

[22] Filed: Jul. 17, 1997

[51] Int. Cl.[6] .................................................. G06F 1/00
[52] U.S. Cl. ................................ 395/750.05; 395/182.22
[58] Field of Search ........................ 395/750.05, 750.07, 395/750.01–750.08, 182.22

[56] References Cited

U.S. PATENT DOCUMENTS

| | | | |
|---|---|---|---|
| 5,361,392 | 11/1994 | Fourcroy et al. .................. | 395/750.02 |
| 5,428,790 | 6/1995 | Harper et al. ..................... | 395/750.04 |
| 5,551,033 | 8/1996 | Foster et al. ............................. | 395/653 |
| 5,560,024 | 9/1996 | Harper et al. ..................... | 395/750.04 |
| 5,649,213 | 7/1997 | Kurihara et al. ................... | 395/750.05 |
| 5,715,467 | 2/1998 | Jirgal ................................ | 395/750.01 |
| 5,765,003 | 1/1998 | MacDonald et al. .............. | 395/750.04 |

OTHER PUBLICATIONS

"Advanced Configuration and Power Interface Specification"; Intel, Microsoft, Toshiba, Revision 1.0; Dec. 22, 1996; pp. i–262.

*Primary Examiner*—Meng-Ai T. An
*Assistant Examiner*—Harold J. Kim
*Attorney, Agent, or Firm*—Gary S. Williams; Flehr Hohbah Test Albritton & Herbert LLP

[57] ABSTRACT

A power sequence controller contains wakeup logic for responding to each wakeup event signal intercepted by the power sequence controller. The wakeup logic compares the intercepted wakeup event signal with a wakeup filter mask to determine if the wakeup event signal should be processed or ignored. If the wakeup event signal requires processing, the wakeup logic transitions the system's processor to a working state. The wakeup logic also determines if the intercepted wakeup event signal requires software processing. If so, a non-zero value associated with the wakeup event signal is stored in an interrupt source register, which causes the processor to execute an interrupt handler procedure and process the wakeup event signal when it transitions to a working state. The wakeup logic also evaluates the processor sleep state to determine if transitioning the processor from the sleep state to a working state requires execution of a processor wakeup procedure to return the processor to normal operation. In addition, the wakeup logic evaluates the processor sleep state to determine whether transitioning the processor from the sleep state to a working state requires sending a processor reset signal to processor, where the reset signal causes the processor to perform a warm or cold boot procedure, depending on the processor's sleep state.

16 Claims, 7 Drawing Sheets

POWER SEQUENCE CONTROLLER WITH WAKEUP LOGIC FOR ENABLING A WAKEUP INTERRUPT HANDLER PROCEDURE

The present invention relates generally to power management of computers and computer controlled systems, and particularly to a power sequence controller and method for transitioning a system from a low power state to a working state in response to qualifying wakeup event signals.

BACKGROUND OF THE INVENTION

In certain low power systems, such as battery operated computers and other battery powered devices that are controlled by a digital processor, there are times during which the system is not being actively used or is not actively performing any useful work. During such times, transitioning the system to a sleep state or low power consumption state will preserve battery power while having minimal impact on system performance. Furthermore, when such systems detect that battery power is below a specified level, switching to a lower power mode of operation will delay the time at which battery power to the system is lost.

Some computers and computer controlled devices include power management software that determines when the device or system meets a predefined inactivity level, and then powers the device down partially or fully. For instance, the predefined inactivity level might be defined as no execution of application programs and receipt of no external event signals (e.g., keystrokes or mouse movement signals from a user interface, or change in the status of another device that is being monitored by the system in question) for a specified period of time (e.g., five minutes, or a user specified amount of time). The manner of powering the device down when the power management software detects the predefined inactivity level can vary greatly from system to system and component to component.

For instance, in some devices power down might be accomplished by saving the current system context in stable storage (e.g., battery backed RAM), and then totally powering down all components of the system other than RAM and the devices used to detect external event signals. Whenever an external event signal is received, the system performs a "warm boot" in which it reloads its context from stable storage and then resumes normal software execution so as to be able to process the external event signal that caused the system to be powered back on.

In other systems, power reduction is accomplished by powering off selected power hungry components, such as mechanical devices, and inhibiting the delivery of clock signals to other devices.

In yet other systems, especially systems where fast response to external signals is deemed to be especially important, power usage is reduced without fully powering the devices most likely to be needed for responding to the external signals. Rather, the rate of the clock signals to some devices (e.g., CMOS devices) is reduced, for example by a specified factor such as two (or four or any other appropriate clock rate reduction factor). Reducing the rate of the clock signal delivered to a data processor (i.e., central processing unit) greatly reduces the power consumed by the processor, while still allowing the processor to continue perform background tasks that use only a small fraction of the system's data processor bandwidth. When a qualifying external event (i.e., one that requires restoring the system to full power) is detected, the power management software changes the rate of the clock signal delivered to the data processor back to its full, normal rate.

It is an object of the present invention to provide a hardware based controller for supporting software based transitioning of a system's power state, including performing wakeup transitioning from low to high power consumption states and power down transitions from a high to low power consumption states.

It is a related object of the present invention that the hardware based controller filter externally generated wakeup event signals so that the system transitions to an operational or full power state only in response to specified qualifying wakeup event signals.

It is another object of the present invention that the hardware based controller determine, based on the sleep state of the system and wakeup event signal received, whether or not transitioning the system from a sleep state to a working state requires software assistance. A further object of the present invention is that the hardware based controller invoke execution of an interrupt handler upon transitioning the system to the working state only when the system's current sleep state and/or the received wakeup event signal require a software assisted wakeup transition.

SUMMARY OF THE INVENTION

The present invention is a power sequence controller for transitioning a system between various defined sleep states and working states. The power sequence controller includes a control register and one or more mask registers for specifying the power state transitions to be made, which wakeup event signals to ignore, which wakeup event signals require processing by an interrupt procedure, and which sleep states require software processing to re-establish normal operation of the system's processor.

A power management procedure executed by the system's CPU downloads into the power sequence controller s control register and mask registers values for controlling the operation of the power sequence controller.

In at least a first one of the defined sleep states the system's central processing unit (CPU) is placed in a low power consumption state without losing its internal context. When the system transitions from the first sleep state to a working state, the CPU can resume execution of the instruction stream it was last executing, without requiring the use of any software to restore or resume the CPU's prior context. In a second one the defined sleep states the CPU is powered down and loses its internal context.

When the system transitions from the second sleep state to a working state the CPU must execute a boot procedure to establish its internal context before resuming execution of its normal instruction stream.

The system in which the power sequence controller is located can receive a variety of wakeup event signals. Wakeup event signals are classified as either (A) non-qualified, (B) qualified and requiring software processing, or (C) qualified and not requiring software processing. Non-qualified wakeup event signals are wakeup event signals that the system can and should ignore. Qualified wakeup event signals requiring software processing are signals that the system must execute an interrupt procedure to handle. The particular interrupt procedure to be executed depends on the wakeup event signal received, and is determined by an interrupt handler. Qualified wakeup event signals not requiring software processing are signals indicating that the system should transition to a working state, but that do not require any special software processing.

The power sequence controller contains wakeup logic for responding to each wakeup event signal intercepted by the power sequence controller. The wakeup logic compares the intercepted wakeup event signal with a wakeup filter mask to determine if the wakeup event signal should be processed or ignored. If the wakeup event signal requires processing, the wakeup logic transitions the system's processor to a working state.

The wakeup logic also determines if the intercepted wakeup event signal requires software processing. If so, a non-zero value associated with the intercepted wakeup event signal is stored in an interrupt source register, which causes the processor to execute an interrupt handler procedure and process the wakeup event signal when it transitions to a working state.

The wakeup logic also evaluates the processor sleep state to determine if transitioning the processor from the sleep state to a working state requires execution of a processor wakeup procedure to return the processor to normal operation.

In addition, the wakeup logic evaluates the processor sleep state to determine whether transitioning the processor from the sleep state to a working state requires sending a processor reset signal to processor, where the reset signal causes the processor to perform a warm or cold boot procedure, depending on the processor's sleep state.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
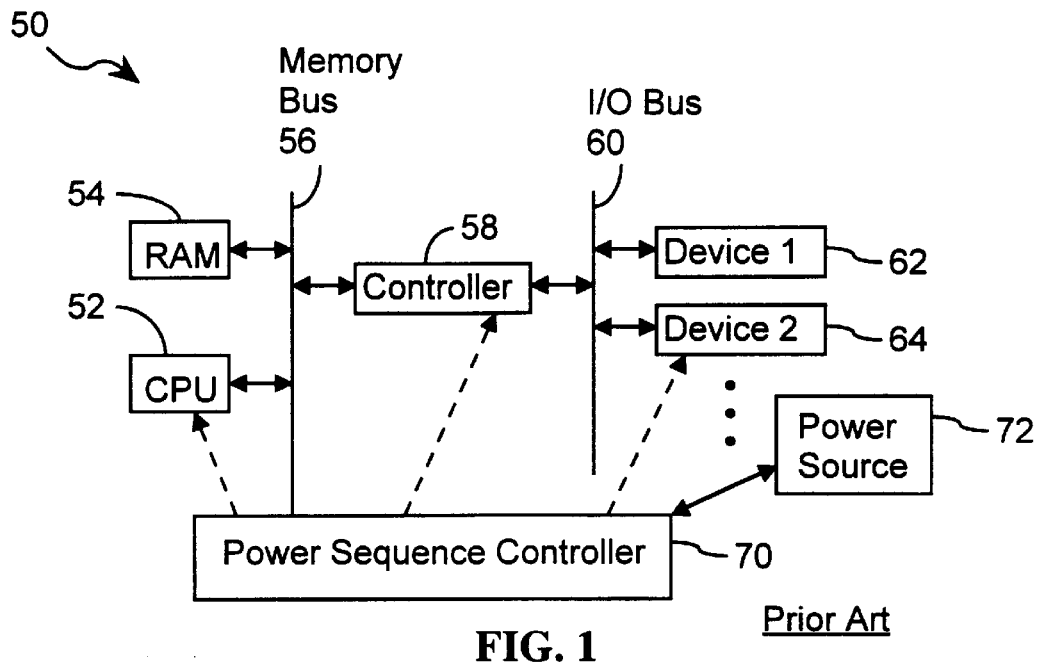
FIG. 1 is a block diagram of a prior art computer system having a power sequence controller.

Referring to FIG. 1, there is shown a prior art computer system (or computer controlled system) 50. The system 50 has a CPU (central processing unit, also called a data processor) and random access memory (RAM), both coupled to a memory bus 56. An input/output or other device controller 58 couples various devices 62, 64 to the CPU 52 and RAM 54 via an I/O bus 60 and the memory bus 56.

A power sequence controller 70 is used to monitor the system's power source 72, which, for example, may be a battery. The power sequence controller 70 operates under software control to control power consumption of various system components. Typically a power management program executed by the CPU 52 sends instructions or control signals to the power sequence controller 70, which then sets the power state of various system components accordingly. The manner of controlling each component's power state tends to be specific to that component. The CPU may also set the power state of other devices in the system directly by sending control signals directly to those devices or their device controllers through the use of appropriate memory mapped commands.

Figure 2:
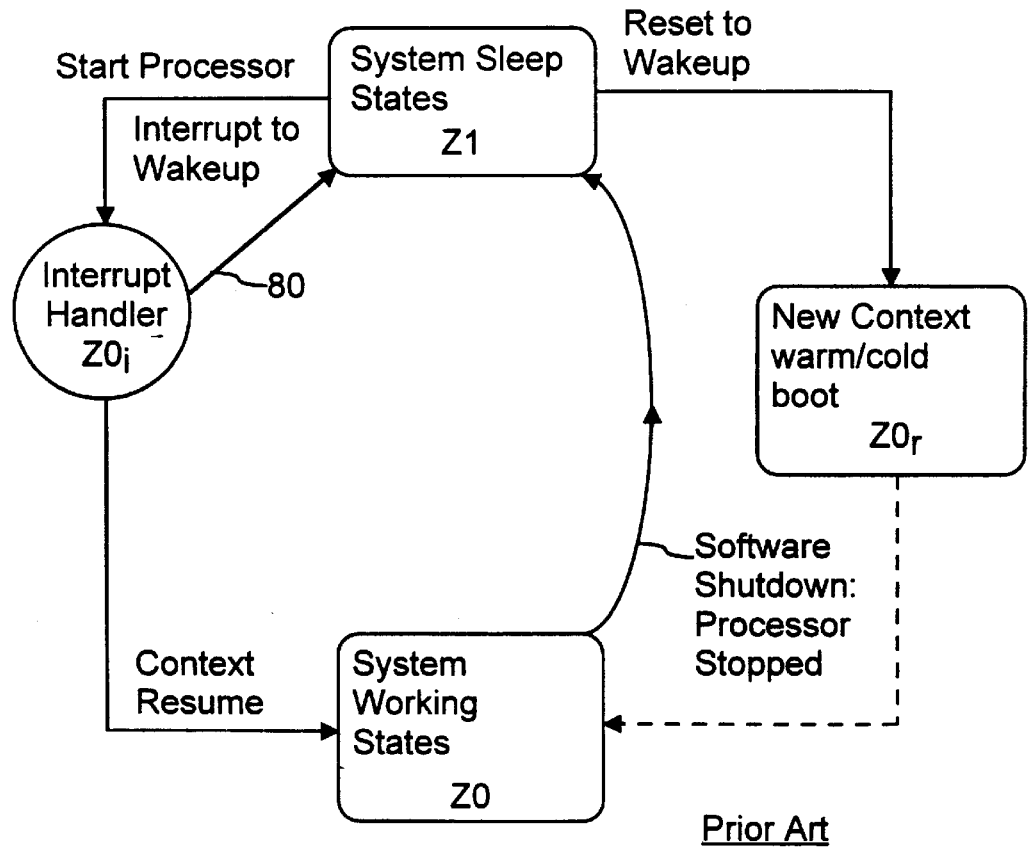
FIG. 2 depicts a system state transition diagram showing state transitions enabled by the power sequence controller in the prior art computer system of FIG. 1.

Referring to FIG. 2, in the prior art computer system 50 of FIG. 1, the system transitions from any of its system working states Z0 to any of its sleep states Z1 via a software controlled shutdown. If there is a direct hardware based shutdown path, such as by a direct full power shut off, it generally causes the system to loose all state information, which is generally contrary to the goals and outside the scope of the power management schemes being considered in this document. Once the processor is in a sleep state, there are generally two main paths to return to a working state.

One path, via an interrupt handler state $Z0_i$, occurs when (A) the sleep state is of the type that allows the previous context to be resumed, and (B) the system receives a wakeup event signal that causes an interrupt handler to be invoked. If the wakeup event signal is of a type that requires waking up the processor 52, the processor is returned to a working state with its previous context resumed. For example, the previous context may be resumed because the processor was never fully powered down and thus the previous context was never lost. Alternately, the previous context may be resumed because an orderly shutdown was performed and the processor's previous context was saved in stable storage, enabling the previous context to be reinstated.

The other path, via a warm or cold boot reset state $Z0_r$, occurs when the sleep state is of the type that powers down the processor 52 in a manner (such as a full power down of the processor) that does not allow the processor to preserve its prior internal context. If the processor's prior context was saved in RAM 54 or on any stable storage such as battery backed memory or disk, a warm boot can be performed to resume the processor's previous context (see warm boot procedure 126 in FIG. 3). If the processor's prior context was not saved, or an orderly shutdown was not performed, then a full cold boot is typically performed (see cold boot procedure 128 in FIG. 3). After the appropriate boot procedure is executed the processor, it typically returns to a working state Z0. A cold boot does not typically resume the processor's prior context because the prior context was not saved. A warm boot typically resumes the processor's prior context if there was one to resume, otherwise it establishes an predefined context (e.g., an idle state context) in the processor.

Figure 3:
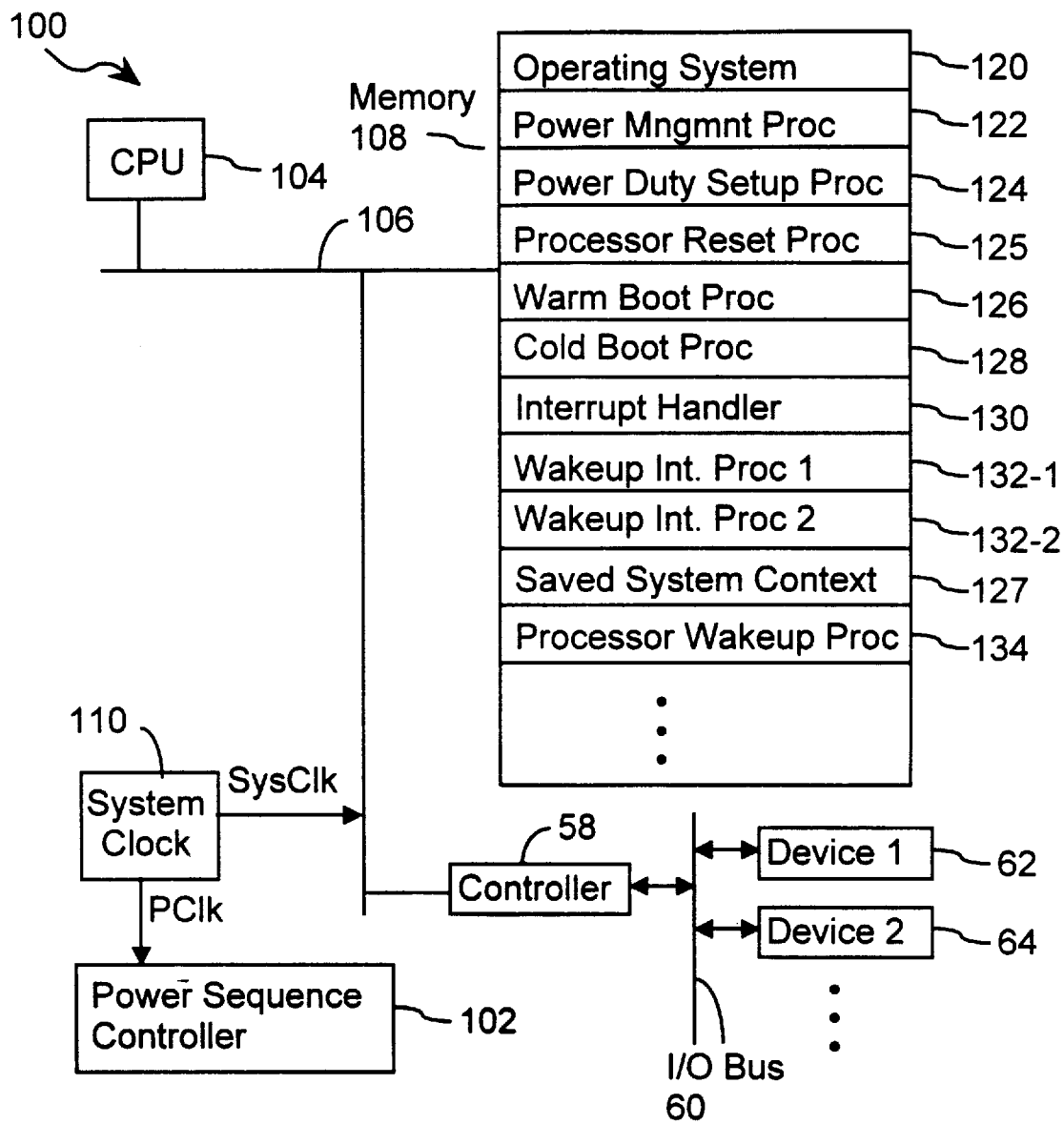
FIG. 3 is a block diagram of a computer system, or computer controller system, incorporating a power sequence controller in accordance with the present invention.

FIG. 3 shows a system 100 incorporating a power sequence controller (PSC) 102 in accordance with the present invention. The system 100 also includes a CPU 104 coupled to a memory bus 106, and memory 108 that is also coupled to the memory bus. Memory 108 in this case may include both RAM and non-volatile devices such as disk storage. The system 100 also includes a system clock 110 that generates a variety of clock signals, including a full rate, ungated clock signal PClk used by the power sequence controller 102 and a gated clock signal SysClk used by system components such as the (CPU 104. The system 100 may also include I/O subsystem components 58, 60, 62, 6 similar to those used in the system 50 shown in FIG. 1. In general, each clock signal that can be inhibited through processor commands or the power management functions of the PSC 102 is called a gated clock signal. However this term does not necessarily imply the presence of an actual gate; the manner in which a clock signal is inhibited or controlled can vary from one implementation to another.

The memory 108 stores software procedures executed by the CPU 104, including:

- an operating system 120;
- a power management procedure 122 for overseeing all power management functions of the system;
- a power duty cycle setup procedure 124, which can be called upon by the power management procedure to store power duty cycle parameters and other power management parameters in the power sequence controller 102;
- a processor reset procedure 125, for handling processor resets, including determining from the sleep state of the processor whether to perform a warm or cold boot;
- a warm boot procedure 126, for restoring the context of the system from a partially powered state, using a saved system context 127 stored in system RAM that has not been powered down or in a non-volatile memory device such as disk storage;
- a cold boot procedure 128, for establishing a processor context when the processor wakes up from a fully powered down state;
- an interrupt handler 130, for handling system interrupts and determining what interrupt procedure, if any, to execute to handle each received interrupt;
- various wakeup interrupt procedures 132 for handling different classes of wakeup events;
- a processor wakeup procedure 134, which is used to perform whatever steps are required to enable the processor to resume normal operation after waking up from certain defined sleep states; and
- other procedures not directly relevant to the subject matter of the present document.

Some aspects of the power management procedure 122, power duty cycle setup procedure 124 and interrupt handler 130 will be discussed in more detail below.

Figure 4:
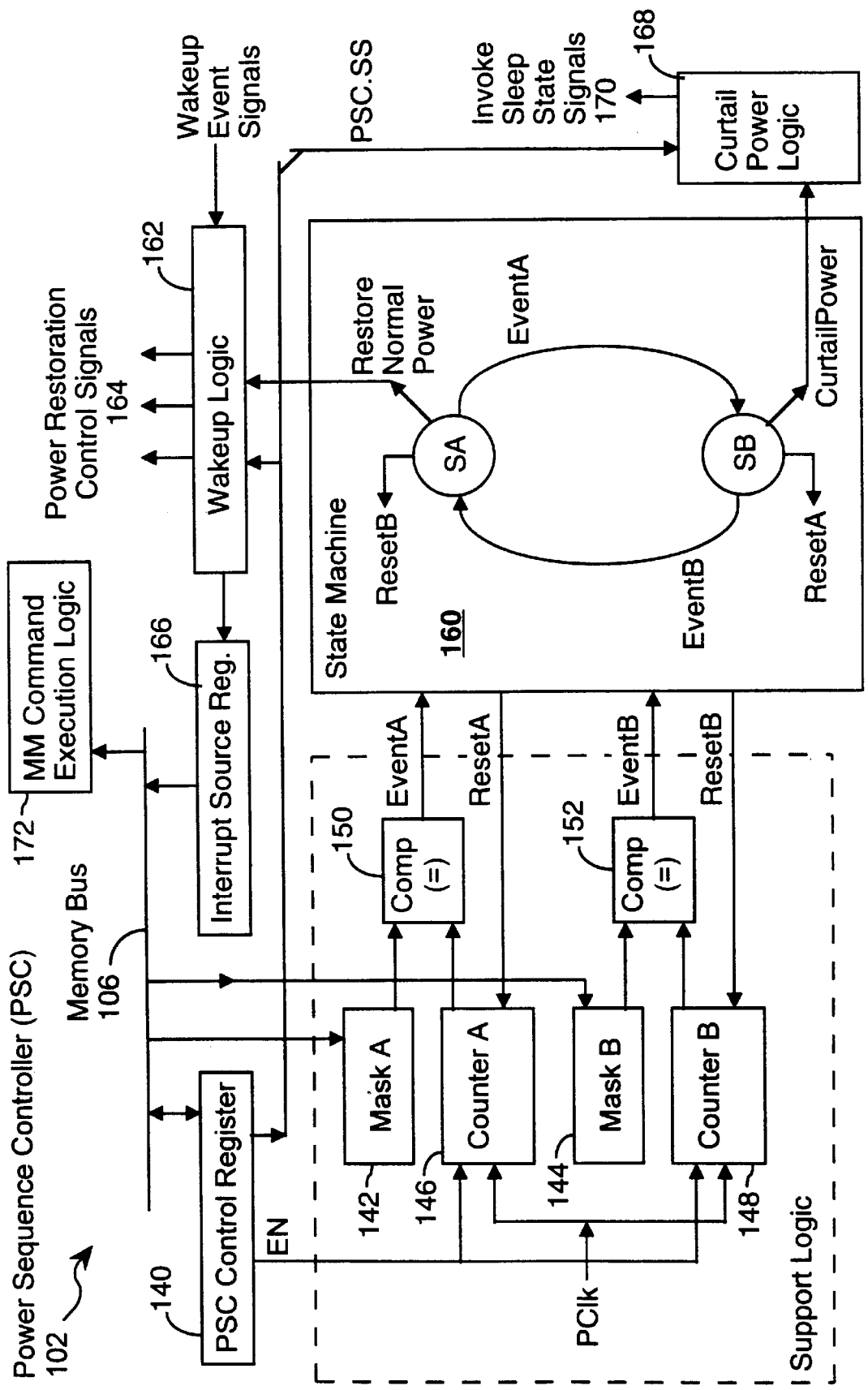
FIG. 4 is a block diagram of a preferred embodiment of a power sequence controller in accordance with the present invention.

FIG. 4 is a block diagram of a preferred embodiment of a power sequence controller 102 in accordance with the present invention. The power sequence controller circuitry shown in FIG. 4 is repeated for each separate data processor (i.e., CPU) in the system that has an independently set sleep state, power state and/or clock state. Furthermore, for each non-CPU device in the system that has an independently set sleep state, power state and/or clock state, the power sequence controller will include a separate instance of the control register 140, wakeup logic 162 and curtail power logic 168. For purposes of explaining the operation of the power sequence controller 102, it will be assumed that the system has just one data processor. Furthermore, the present document is not specifically concerned with controlling the power usage of non-CPU devices, except where otherwise noted.

The operation of the power sequence controller is determined primarily by data values downloaded under software control into a control register 140 and two power duty parameter registers 142, 144 (called Mask A and Mask B). The power duty cycle setup procedure 124 is used to download these parameters into the power sequence controller 102.

The automatic power duty cycle circuitry of the power sequence controller is enabled when a flag value EN stored in the control register 140 has a first logic value (e.g., a value of True or "1"), and is disabled when that flag value EN has a second, opposite logic value. The power duty cycle setup procedure 124 enables and disables the automatic power duty cycle circuitry by loading appropriate flag EN values into the control register 140 of the power sequence controller 102.

The power sequence controller 102 has two free running counters 146, 148 that are clocked by an ungated system clock signal PClk. The ungated system clock signal PClk is delivered to the power sequence controller 102 even when other portions of the "system clock tree" have been inhibited by the system being in a sleep state. The "system clock tree" consists of a number of gated signal paths emanating from the system clock generator. The clock signals on a gated signal path may be blocked when a corresponding gating signal is disabled by the power sequence controller.

Each counter 146, 148 counts from zero after it is reset by a corresponding reset signal, ResetA or ResetB. The count value in Counter A 146 is compared with the value stored in Mask A 142 by a first comparator 150. The comparator 150 generates an EventA signal when the Counter A value matches the Mask A value. Similarly, the count value in Counter B 148 is compared with the value stored in Mask B 144 by a second comparator 152. The second comparator 152 generates an EventB signal when the Counter B value matches the Mask B value.

The power sequence controller 102 also has a state machine 160 having two states: state SA and state SB. In state SA the state machine generates the ResetB signal, which resets Counter B to zero and also inhibits Counter B as long as the state machine remains in state SA. In state SA the state machine enables the computer system to resume normal operation in a powered working state by generating control signals that restore normal power and/or clock signals to the computer system.

In state SB the state machine generates the ResetA signal, which resets Counter A to zero and also inhibits Counter A as long as the state machine remains in state SB. In state SB the state machine forces the computer system into a low power or sleep state by generating control signals that reduce power consumption by various ones of the system components. The manner in which power consumption is reduced is highly dependent on the design and requirements of each of the system components whose power consumption is being reduced. These techniques, which include inhibiting clock signals to various system components, reducing the rate of the clock signals delivered to various system components, reducing the voltage or current delivered to various system components, and powering down various system components, are well known to those skilled in the art and are not the subject of the present invention.

While the state machine is in state SA, when EventA occurs the state machine transitions to state SB and power is conserved. While the state machine is in state SB, when EventB occurs the state machine transitions to state SA and power and clock signals are restored. The computer system can be returned to its full power working state when certain qualifying external event signals, herein called wakeup event signals, are received by the system. Such external event signals typically indicate events that require immediate processing by the system. When any such external wakeup event signal is received, it is processed by a wakeup logic circuit 162. If the external wakeup event signal is one that is deemed by the logic circuit 162 to be a qualifying signal, the wakeup logic circuit generates power restoration control signals 164 that restore power and clock signals to the computer system.

When the wakeup logic circuit 162 receives a wakeup event signal requiring software processing, typically by an interrupt procedure, the wakeup logic circuit 162 stores a corresponding value in an Interrupt Source Register 166, where the stored value indicates which interrupt procedure to execute or the wakeup event signal that was received, or both. The Interrupt Source Register 166 is automatically read and cleared by the interrupt handler 130 whenever it contains a non-zero value.

The wakeup logic circuit also receives a "restore normal power" signal from the state machine 160 whenever it transitions to state SA. Further details of the wakeup logic circuit's operation are described in U.S. patent application Ser. No. 08/895,728, filed Jul. 17, 1997.

A curtail power logic circuit 168 receives a "curtail power" signal from the state machine whenever it enters state SB. The curtail power logic circuit 168 generates sleep state invoking signals 170 that put the computer system into a sleep state in which power is conserved, but the system's CPU(s), RAM, and possibly other components continue to receive sufficient power to maintain their context information. The most common example of such a sleep state is one in which clock signals to the CPU are inhibited, but otherwise all devices in the system remain in their previous state. As a result, the system is returned to its previous power state simply by enabling the delivery of clock signals to the CPU. In other systems, the power conservation state may be achieved using more sophisticated power conservation measures than simply inhibiting the clock signal delivered to the CPU.

The power sequence controller 102 also includes memory mapped command execution logic 172 for executing memory mapped commands sent to it by the system's processor(s). Typical memory mapped commands executed by the logic 172 include commands for transitioning a processor or other device to a sleep state or working state specified in a corresponding instance of the PSC control register 140.

The amount of time that the system spends in the power conservation mode (typically called a sleep state) is determined by the value stored in mask B, and the amount of time that the system spends in the full power mode (i.e., a working state or operational state) is determined by the value stored in mask A. The ratio of the mask A value to the sum of the two masks values is called the power duty cycle. For instance, if the value stored in mask A is equal to 1000 and the value stored in mask B is equal to 4000, then the power duty cycle is equal to 0.20 (i.e., 1000 divided by 5000) or 20%.

As described above, the power sequence controller 102 can cycle a computer system between sleep and working states automatically, without involving any software overhead. Each time the system is returned to its full power working state the CPU continues with the same instruction stream that was being executed before power consumption was curtailed. No software is needed to recover or resume the system's previous context when the transition to a working state is caused by the automatic power duty cycle state machine 160 of the power sequence controller 102.

The automatic power duty cycle feature may be employed to lower the overall power consumption of a device or system (A) that is experiencing a low activity level for a prolonged period of time, or (B) for which power conservation is of prime importance, such as when the device or system's battery is running low on power, while still giving the user a reduced degree of functionality.

The automatic power duty cycle feature of the present invention is mainly useful for those devices in a system that do not loose state (or are stateless) when the device's clock signal is inhibited or when the device's power is lowered by device dependent means.

A power sequence controller having the automatic power duty cycle feature of the present invention may still be used to handle system wakeups from other sleep states where context information is lost, as well as other system wakeup modalities in which software processing is required. For instance, the power management procedure 122 may put the system in a sleep state requiring software intervention upon wakeup, thereby disabling or overriding the operation of the power duty cycle circuitry and state machine. Similarly, a wakeup event signal requiring software processing may be received while the system is in a sleep state initiated by the automatic power duty cycle state machine 160. Such a wakeup event signal may cause a transition to a working state that overrides the operation of the automatic duty cycle state machine 160. The wakeup logic 162 is used to distinguish between different wakeup modalities and to generate the appropriate power restoration signals.

Furthermore, independent of the power sequence controller 102, the power management software 120 may explicitly shut down devices that are not being used, and those devices will be outside the control of the automatic power duty cycle circuitry within the power sequence controller 102.

Figure 5:
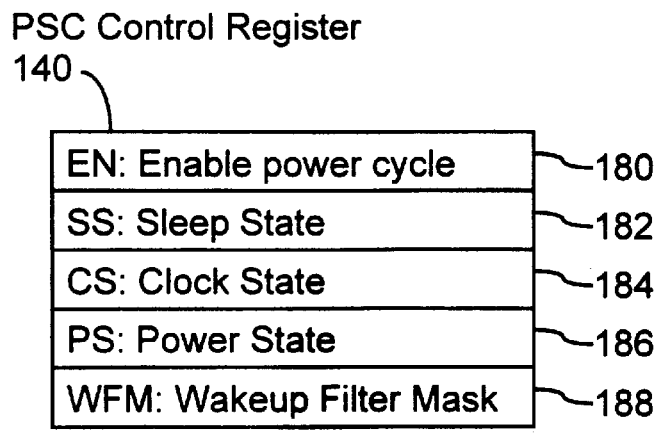
FIG. 5 depicts the contents of a power sequence controller's control register in a preferred embodiment of the present invention.

Referring to FIG. 5, the power sequence controller's control register 140, in a preferred embodiment, is used to store the following parameters downloaded by the system's CPU:

EN: a flag value 180 for enabling and disabling the automatic power duty cycle circuitry of the power sequence controller;

SS: the sleep state 1182 to be invoked by the curtail power logic 168 (for example whenever the automatic power duty cycle state machine 160 transitions to state SB); this field of the PSC control register is also used by the processor, after transitioning to a working state, to determine the processor's prior sleep state;

CS: the clock state 184 to be invoked by the wakeup logic 162 whenever the system transitions from a sleep state to a working state (e.g., when the automatic power duty cycle state machine 160 transitions to state SA);

PS: the power state 186 of the system's CPU that is to be invoked by the wakeup logic 162 whenever the system transitions from a sleep state to a working state (e.g., when the automatic power duty cycle state machine 160 transitions to state SA); and WFM: a wakeup filter 188 mask used by the wakeup logic 162 to determine which wakeup event signals to process and which to ignore.

In an alternate embodiment (e.g., for use in a system in which the processor has just one power state associated with being in an operational working mode, but has two or more power states associated with being in a sleep mode) the power state stored in the PSC control register is used to specify the power down state of the processor when the system is in a sleep state. In this alternate embodiment the PSC 102 puts the processor in the power state specified in the PSC control register during a shutdown sequence. Further, either the PSC's wakeup logic 162, or wakeup procedures executed by the processor when it transitions to an operational working state, use the power state value stored in the PSC control register to determine the actions required to return the processor to an operational working state.

Figure 6:
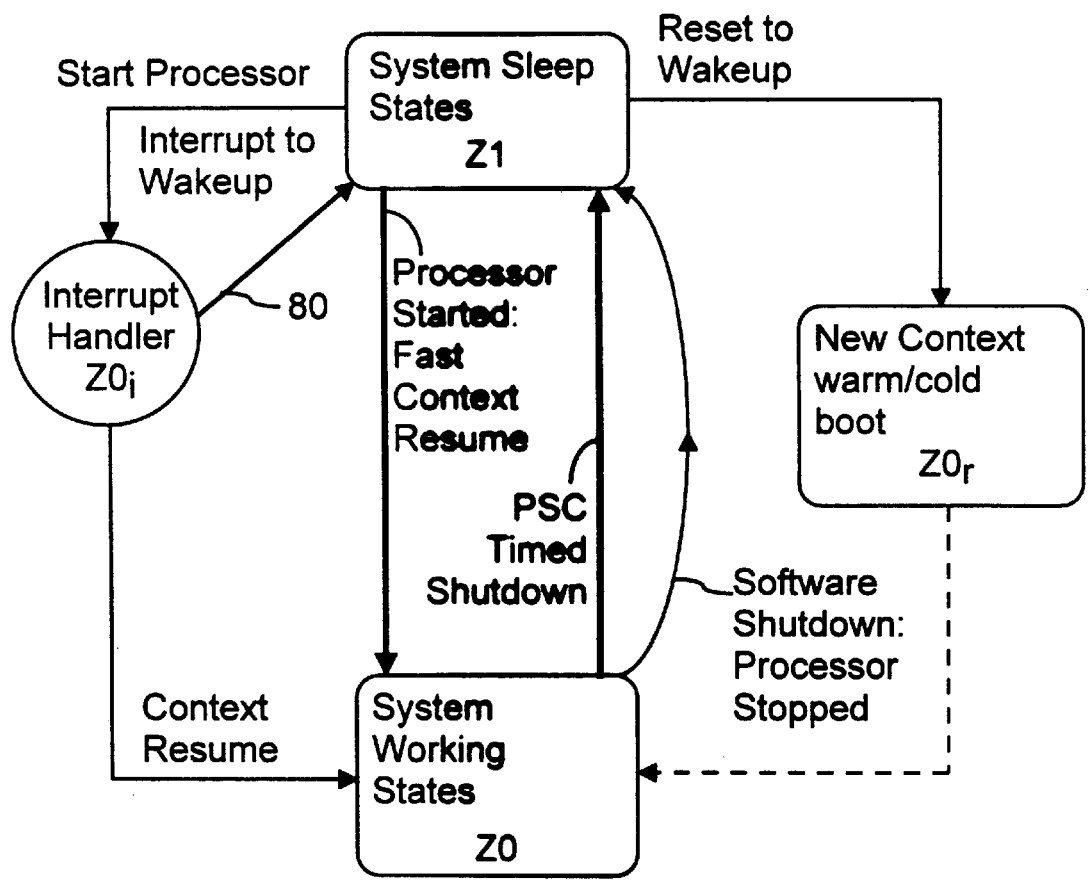
FIG. 6 depicts a system state transition diagram showing new state transitions enabled by the power sequence controller in a preferred embodiment of the present invention.

Referring to FIG. 6, the system state transition diagram for the system 100 incorporating the power sequence controller (PSC) 102 of the present invention includes two additional state transitions not present in the prior art system state transition diagram of FIG. 2. In particular, there is a PSC-timed shutdown transition from the system working states Z0 to the system sleep states Z1 that occurs whenever the automatic power duty cycle state machine 160 transitions to state SB. This transition to a sleep state does not require software intervention. There is also a fast context resume transition from the system sleep states Z1 to the system working states Z0 that occurs whenever the automatic power duty cycle state machine 160 transitions to state SA. This transition to a system working state also does not require software intervention. Thus, both of the new state transitions are hardware controlled power state transitions that do not require software intervention. As a result, the software overhead normally associated with powering a device back on is avoided. This also allows the power duty cycle of the device to be reduced, since the processor cycles normally associated with software overhead for powering a device back on are avoided.

Wakeup Logic

Figure 7:
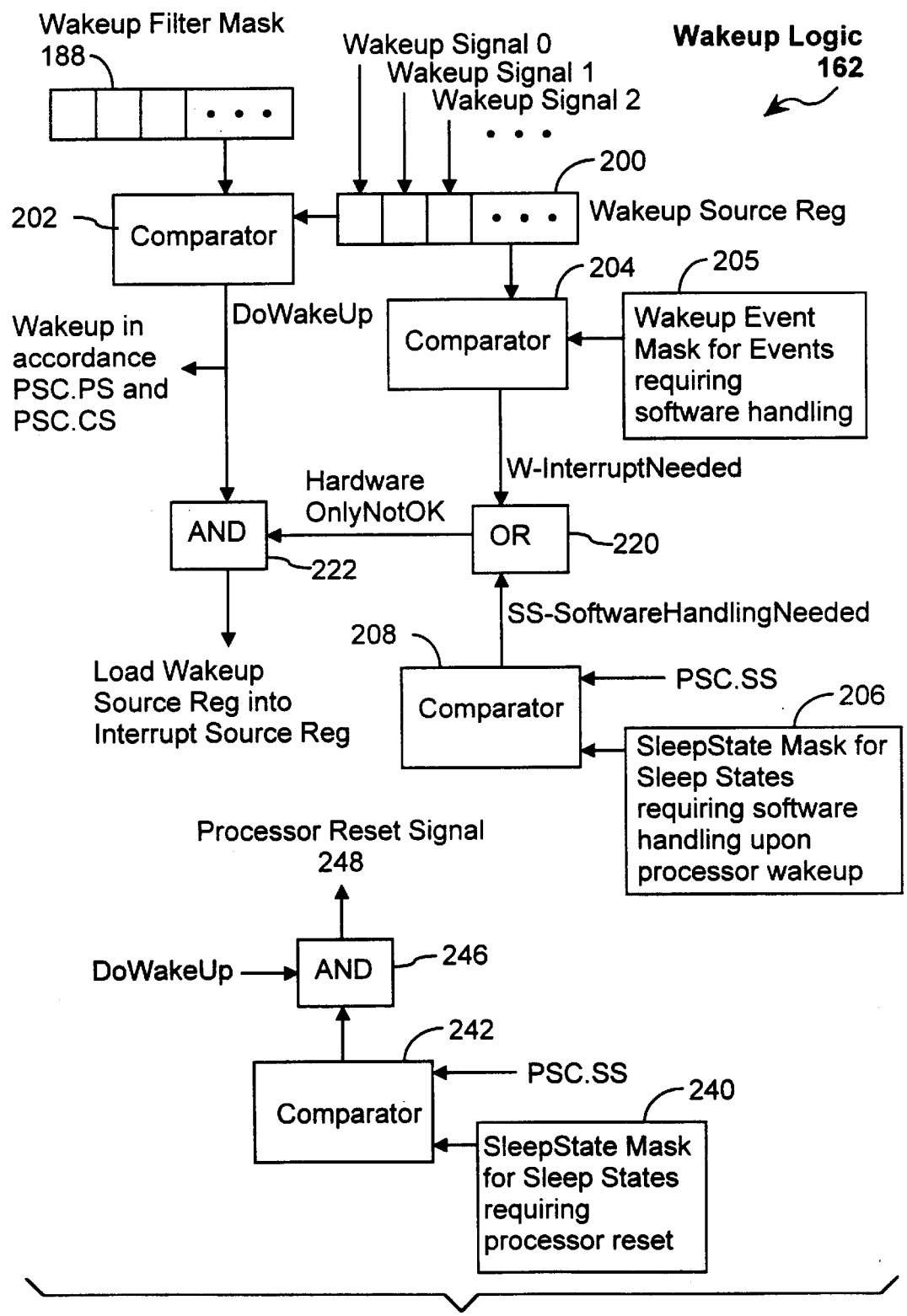
FIG. 7 depicts a preferred embodiment of the wakeup logic circuit in a power sequence controller in accordance with the present invention.

Referring to FIGS. 4 and 7, the power sequence controller includes a control register 102 and one or more mass registers 205, 206, 240 for specifying the power state transitions to be made, which wakeup event signals to ignore, which wakeup event signals require processing by an interrupt procedure, and which sleep states require software processing to resume normal operation of the system's CPU when the system transitions to a working state. If the system has more than one processor (CPU) whose sleep state, power state and/or clock state are independently set, the PSC 102 circuitry is repeated for each processor having an independently set sleep state, power state and/or clock state. Alternately, one instance of the PSC circuitry could be used in conjunction with one processor that is responsible for controlling the sleep and work states of the other processors. In this implementation the PSC might still have a separate control register for each processor, but just one instance of the other PSC circuitry. Except where otherwise indicated, the wakeup logic will be explained with respect to a single processor.

As indicated earlier, power management procedures 122, 124 (see FIG. 3) executed by the system's CPU download into the power sequence controller's control register 102 and mask registers 205, 206, 240 values for controlling the operation of the power sequence controller.

A processor can have a number of implementation specific sleep states, designated S0, S1, S2, . . . , clock states, designated C0, C1, C2, . . . , and power states, designated P0, P1, P2, . . . . Different sleep states correspond to different reduced power states of the processor. The power states are used to specifically control the power state of the processor after the processor transitions from a sleep state to a working state. Some processors have more than one power state that can be utilized while the processor executes instructions, as well as one or more low power sleep states for when the processor is not executing instructions. For instance, a processor may have full speed and half speed power modes, as well as a power on with inhibited clock mode and a power off mode.

The clock state is used to specify a clocking frequency for the associated processor, as well as any other implementation dependent state that might be associated with that clocking state. If different devices in the system can have different, independently set clock states, and the clock state for those devices are controlled by the PSC (as opposed to being directly controlled by the system's CPU) each will have its own PSC control register 140, wakeup logic 162 and curtail power logic 168.

In the preferred embodiment, the processor with which the power sequence controller is used has at least two sleep states: in a first sleep state the CPU's internal computational context is preserved, and in a second sleep state the CPU's internal computational context is not preserved. For purposes of explaining the operation of the invention, we will assumes a data processor with the following sleep states:

S0: the processor's internal context is preserved, only the processor's clock is inhibited;

S1: the processor's internal context preserved, its clock is inhibited, but its external caches are powered down;

S2: the processor is powered down, its internal context is not preserved within the processor, but the processor's internal context is saved in RAM or non-volatile memory (e.g., disk storage) before entering the sleep state; and S3: the processor is powered down, and its internal context is not saved before entering the sleep state.

When the system transitions from the S0 sleep state to a working state, the CPU can resume execution of the instruction stream it was last executing, without requiring the use of any software to restore or resume the CPU's prior computational context. Also, no software is required to return the CPU to normal operation.

In the S1 sleep state the processor retains its internal context, but software handling is required to restore it to full function. In this example, the external caches of the processor must be powered back on, which is accomplished by the processor executing a processor wakeup procedure 134 that issues the appropriate memory mapped commands to turn the external caches back on. Thus, when the system transitions from the S1 sleep state to a working state the CPU must execute the processor wakeup procedure 134 to turn the external caches back on, and to perform whatever other steps are required to enable the processor to resume normal operation.

When the processor transitions from the S2 sleep state to a working state the processor must execute a warm boot procedure 126 to reload its prior context into the processor. The prior processor context is reloaded by the warm boot procedure 126 from whichever memory device it was stored in prior to the processor going into the S2 sleep state. For instance, the processor context may be loaded from RAM, disk storage, or any other appropriate storage medium.

When the processor transitions from the S3 sleep state to a working state the processor must execute a cold boot procedure 128 to establish a new internal context.

In the preferred embodiments, prior to transitioning to a sleep state the processor uses the power management procedure 122 to load the power sequence controller's control register 140 with a sleep state value 182, power state value 186, clock state value 184 and wakeup filter mask 188. The sleep state value 182 indicates the sleep state that the processor is about to transition to, and the power state value 186 and clock state value 184 indicate the power and clock state the processor is to be placed in when it next wakes up.

After loading the PSC control register 140 for the processor, the processor may transition to the previously selected sleep state by executing any memory mapped instructions needed to transition other devices in the system to their corresponding sleep state and (A) executing a processor shut down instruction to transition the processor to the selected sleep state, or (B) send a memory mapped command to the PSC 102 to instruct the PSC to put the processor in the specified sleep state. As indicated earlier, the PSC 102 includes memory mapped command execution logic 172 (see FIG. 4) for executing memory mapped commands sent to it by the system's processor(s). Typical memory mapped commands executed by the logic 172 include commands for transitioning a processor or other device to a sleep state or working state specified in a corresponding instance of the PSC control register 140.

The system 100 in which the power sequence controller 102 is located can receive a variety of wakeup event signals. Wakeup event signals are classified as either (A) non-qualified, (B) qualified and requiring software processing, or (C) qualified and not requiring software processing. Non-qualified wakeup event signals are wakeup event signals that the system can and should ignore. Qualified wakeup event signals requiring software processing are signals that the system must execute an interrupt procedure to handle. The particular interrupt procedure to be executed depends on the wakeup event signal received, and is determined by an interrupt handler. Qualified wakeup event signals not requiring software processing are signals indicating that the system should transition to a working state, but that do not require any special software processing.

The power sequence controller 102 contains wakeup logic 162 that intercepts and responds to at least some of the wakeup event signals received by the system. Other circuitry may be used to receive and process other wakeup signals. Wakeup signals not intercepted by the power sequence controller 102 are outside the scope of this document and will not be considered further.

Referring to FIG. 7, each wakeup event signal intercepted by the power sequence controller is temporarily stored in a wakeup source register 200. The wakeup logic circuitry in FIG. 7 determines when to wake up the processor corresponding to this instance of the wakeup logic, and when software handling is needed in conjunction with that wakeup operation The circuitry in FIG. 7 also determines when to reset the processor, causing it to perform a warm or cold boot.

The signal processing functions performed by the wakeup logic 162 can be summarized by the following sequence of pseudocode statements:

---

If (the intercepted wakeup event does not pass the wakeup filter)
    Then: {Ignore the wakeup event}
Else
    {
    Generate a processor wakeup signal
    If (the sleep state requires software handling upon processor wakeup)
        OR (the wakeup event requires software handling)
        Then: {Pass the wakeup event as an interrupt to the processor
        such that the processor handles the interrupt before executing
        any instructions from its previous instruction stream}
    Else
        {Resume execution of the processor's previous instruction
        stream and do not generate a wakeup event interrupt}

---

-continued

If (the sleep state requires a warm or cold boot when the processor
    transitions to a working state}
    Then: {Generate a processor reset signal}
}

---

In a preferred embodiment, the wakeup logic 162 uses four comparator circuits to analyze an intercepted wakeup event signal and the current processor sleep state. Each of the four comparator circuits used in the wakeup logic 162 may be implemented using a bitwise AND gate that logically ANDs the bits of a mask register with the bits of the wakeup source register or the sleep state field PSC.SS, and an OR gate for determining if any of the output bits from the AND gate are equal to one. The output from the OR gates is the output of the comparator circuit.

The wakeup logic 162 uses a first comparator circuit 202 to compare the wakeup event signal in register 200 with the wakeup filter mask 188 stored in the control register. The comparator 202 generates a DoWakeUp signal that indicates whether the wakeup event signal should be processed or ignored. If the intercepted wakeup event signal is a non-qualified wakeup event signal, as indicated by a corresponding bit in the wakeup filter mask 188, then the DoWakeUp signal will be equal to a logical 0, causing the wakeup event signal to be ignored. When the comparator generates a DoWakeUp signal equal to a logical 1, the wakeup logic circuit generates a set of signals for transitioning the system to a working state in accordance with the power state and clock state values in the control register 140.

The wakeup event signal is also compared (using a second comparator 204) with a second mask 205 to determine if the received wakeup event signal requires software processing. The second comparator 204 outputs a W-InterruptNeeded signal equal to a logical 1 if the mask 205 indicates that the intercepted wakeup event signal requires software handling (i.e., by executing an appropriate interrupt procedure). The second comparator 204 outputs a W-InterruptNeeded signal equal to a logical 0 if the mask 205 indicates that the intercepted wakeup event signal does not require software handling.

In a preferred embodiment, the contents of the mask 205 are stored in that mask 205 by the power management procedure 122. This allows the power management procedure to specify which wakeup event signals require separate software handling and which do not. In an alternate embodiment in which the definitions of all wakeup event signals are fixed, either (A) the mask pattern in the mask 205 may be permanently fixed, or (B) the mask 205 and comparator 204 may be replaced by more efficient hardwired logic for determining whether an interrupt is needed to process a received wakeup event signal.

In addition, the wakeup logic compares (using a third comparator 208) the system's current sleep state with a third mask 206 to determine if transitioning from the sleep state to a working state requires execution of a processor wakeup procedure. The third comparator 208 compares the bits of the sleep state field 182 in the control register 140 with the bits of a sleep state software processing mask 206. It outputs a SS-SoftwareHandlingNeeded signal equal to a logical 1 if the mask 206 indicates that a processor wakeup procedure needs to be executed to restore the processor to normal operation, for example to turn on powered down peripheral circuits. SS-SoftwareHandlingNeeded is equal to 0 if (A) the processor sleep state indicates a cold or warm boot is needed, in which case the appropriate boot procedures will handle powering back on the processor's peripheral circuits, or (B) the processor sleep state indicates that the processor is ready to resume instruction execution as soon as it is returned to its working state, without requiring execution of the processor wakeup procedure.

In a preferred embodiment, the contents of the sleep state software processing mask 206 are stored in that mask 206 by the power management procedure 122. This allows the power management procedure 122 to specify which sleep states require software handling to return the processor to normal operation and which do not. In alternate embodiment in which set of sleep states for the processor are fixed, either (A) the mask pattern in the sleep state software processing mask 206 may be permanently fixed, or (B) the mask 206 and third comparator 208 may be replaced by more efficient hardwired logic for determining when software handling is needed to restore the processor to normal operation.

The results from the three comparators 202, 204, 208 are combined by an OR gate 220 and an AND gate 222 to determine whether or not to load the value in the wakeup source register 200 into the interrupt source register 166. The two signals logically ORed by OR gate 220 both indicate whether software processing is required before the processor can resume executing the instruction stream is was executing before entering a sleep state. The output of the OR gate is a signal called HardwareOnlyNotOK, which is equal to a logic 1 if the intercepted wakeup event signal requires software processing and/or the sleep state indicates that software processing is required to return the processor to normal operation.

AND gate 222 logically ANDs the DoWakeUp and HardwareOnlyNotOK signals. The output of AND gate 222 is equal to a logical 1 only if a qualified wakeup event signal has been received and software processing is required to handle either the wakeup event or the transition to a working state. When the output of AND gate 222 is equal to a logical 1, the contents of the wakeup source register (which identify the intercepted wakeup event signal) are loaded into the interrupt source register 166.

The presence of a non-zero value the interrupt source register 166 will cause the CPU to execute its interrupt handler procedure 130, instead of the next instruction in its instruction stream, when the processor transitions back to a working state. If the processor undergoes a reset, the appropriate boot procedure will be executed first, followed by the interrupt handler procedure 130 and then the next instruction in its instruction stream. The interrupt handler procedure 130 reads, processes and clears the value in the interrupt source register 166, thereby processing the intercepted wakeup event signal.

The wakeup logic 162 includes a fourth comparator 242 for determining whether to invoke a processor reset. The fourth comparator 242 compares the bits of the sleep state field 182 in the control register 140 with the bits of a sleep state reset mask 240. It outputs a processor reset signal 248 equal to a logical 1 if the mask 240 indicates that a processor reset is needed to wake up from the processor's current sleep state. The processor reset signal 248 causes the processor to perform a warm or cold boot, depending on the processor's prior sleep state.

If a qualifying wakeup event signal is received, but the wakeup event signal does not require software handling, and the processor's current sleep state does not require software handling and does not require resetting the processor, then the wakeup logic 162 wakes up the processor but does not store anything in the interrupt source register and does not generate a processor reset signal. As a result, the processor will perform a "hardware only" transition to a working state, resuming its prior context and resuming execution of its instruction stream without requiring any preparatory software handling.

Processor Reset Procedure

Figure 8:
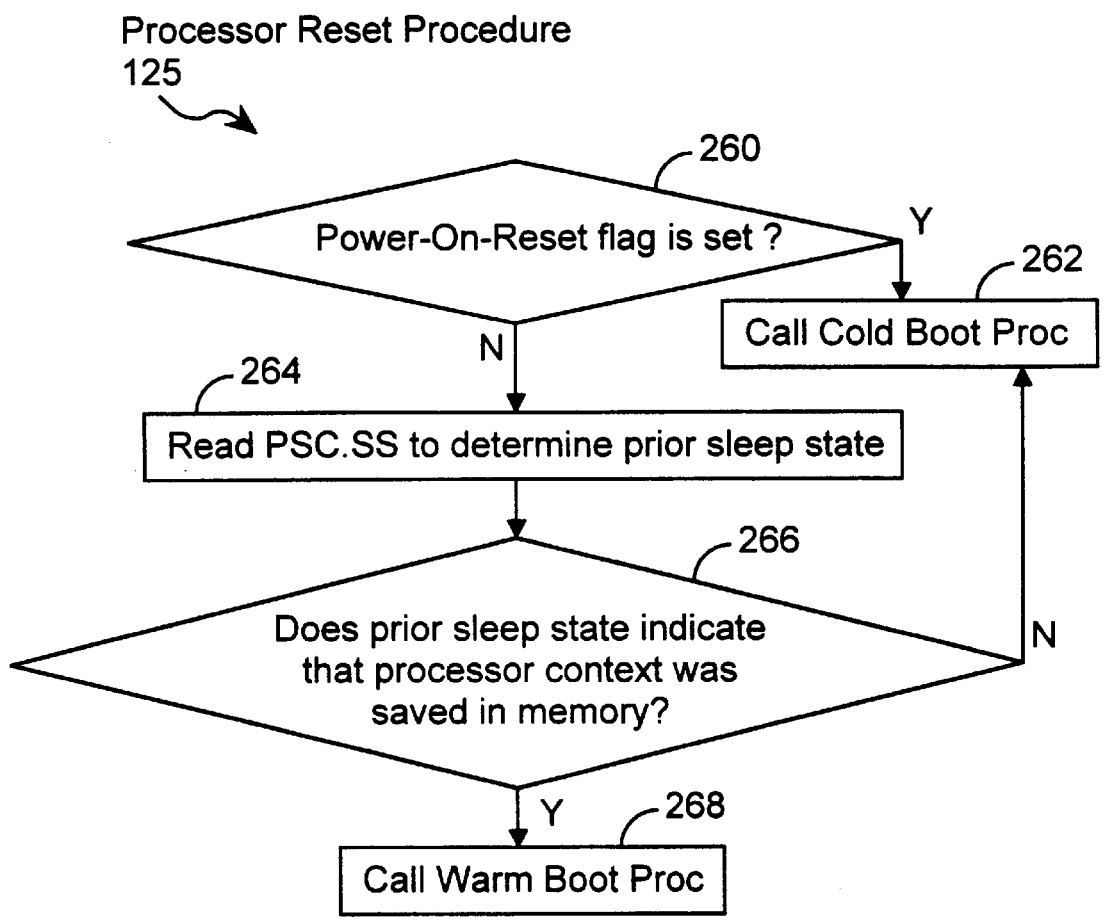
FIG. 8 is a flow chart of steps performed by the processor reset procedure in a preferred embodiment of the present invention.

Referring to FIG. 8, the processor reset procedure 125 is automatically invoked whenever the processor is reset. The procedure checks an internal power-on reset flag (step 260) to determine if the processor reset was caused by the system's power being turned on. If internal power-on reset flag is set (260-Y), the cold boot procedure is called (step 262) to establish a new processor context. If the internal power-on reset flag is not set (260-N), the procedure determines the processor's prior sleep state by reading the sleep state field of the PSC's control register 140 (step 264). If the sleep state value indicates that the prior sleep state is one in which the processor's context was saved in memory (e.g., RAM or disk storage) (266-Y), the warm boot procedure is called (step 268) to restore the processor context from memory and resume use of that context. If the sleep state value indicates that the processor's prior context was not saved in memory (266-N), the cold boot procedure is called (step 262).

After the appropriate boot procedure is executed, the processor will invoke the interrupt handler procedure if the interrupt source register 166 contains a non-zero value. Otherwise it will resume execution of the processor's instruction stream.

Interrupt Handler Procedure

Figure 9:
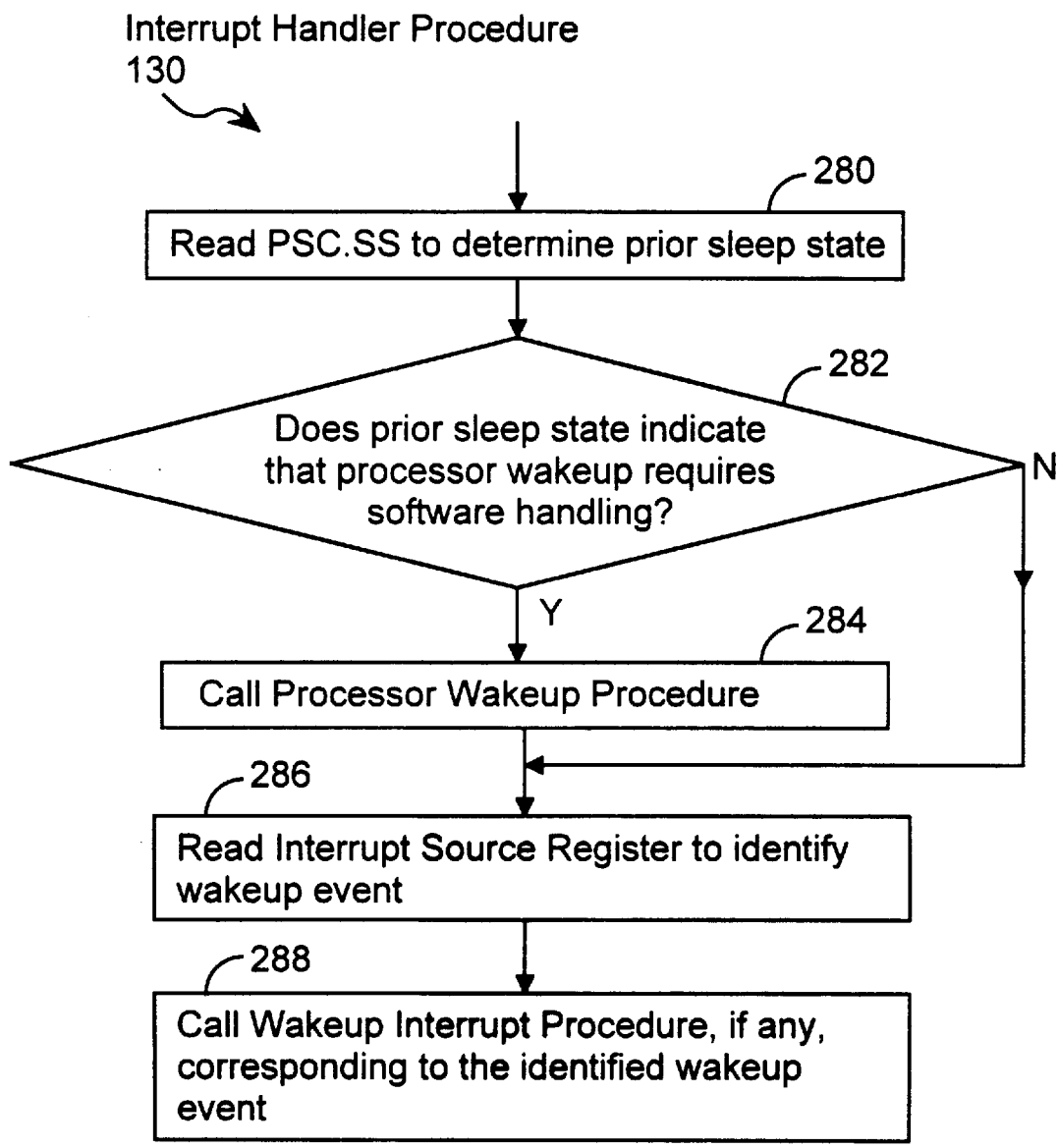
FIG. 9 is a flow chart of steps performed by the interrupt handler procedure in a preferred embodiment of the present invention.

Referring to FIG. 9, the interrupt handler procedure 130 begins by reading the sleep state field (PSC.SS) of the PSC control register to determine the processor's prior sleep state (step 280). If the sleep state field value indicates that the processor requires software handling for resuming normal operation (282-Y), the processor wakeup procedure 134 is called to turn the processor's external caches back on, and/or to perform whatever other steps are required to enable the processor to resume normal operation after waking up from certain defined sleep states (284).

If the processor was not in a sleep state just prior to execution of the interrupt handler, or if the sleep state field value indicates that the processor does not require any software handling for resuming normal operation (282-N), step 284 is skipped and procedure continues at step 286.

Next, the processor reads the interrupt source register 166 to identify the wakeup event signal intercepted by the power sequence controller 102 (step 286). Based on the identity of the wakeup event signal, the interrupt handler will call the wakeup interrupt procedure, if any, corresponding to the identified wakeup event signal (288). If the intercepted wakeup event signal does not require interrupt processing, the interrupt handler exits without calling a wakeup interrupt procedure.

Alternate Embodiments

Other circuitry than that shown in the Figures could be used to implement the functions of the power sequence controller.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A power sequence controller for use in a device having a processor for executing instructions in an instruction stream, comprising:

a first wakeup mask for storing a mask value indicating which of a predefined set of wakeup event signals are to be ignored and which require transitioning the processor from a sleep state to a working state;

a second wakeup mask for storing a mask value indicating which of the predefined set of wakeup event signals require software processing;

wakeup logic for comparing a wakeup event signal intercepted by the power sequence controller with the first wakeup mask and for generating a processor wakeup signal when the comparison indicates that the intercepted wakeup event signal requires transitioning the processor to the working state; and wakeup interrupt logic for determining whether the intercepted wakeup event signal requires software processing, and for storing a non-zero value associated with the wakeup event signal in an interrupt source register when the determination indicates that software processing is required;

wherein the wakeup interrupt logic compares the intercepted wakeup event signal with the second wakeup mask to determine whether the intercepted wakeup event signal requires software processing;

the non-zero value in the interrupt source causes the processor to execute an interrupt handler procedure and process the intercepted wakeup event; and when the wakeup logic generates a processor wakeup signal in response to the intercepted wakeup event signal and the wakeup interrupt logic determines that the intercepted wakeup event does not require software processing, the wakeup logic transitions the processor to a working state so as to resume execution of an instruction stream in a previously defined processor context, without enabling execution of the interrupt handler procedure.

2. The power sequence controller of claim 1, further including sleep wakeup logic for evaluating, when the processor is in a sleep state, the processor's sleep state so as to determine whether transitioning the processor from the current sleep state to the working state requires execution of a processor wakeup procedure to return the processor to the working state, and for generating a processor interrupt signal when the determination indicates that execution of the processor wakeup procedure is required.

3. The power sequence controller of claim 2, including a configuration register for storing a sleep state indicia for the processor, the processor's sleep state indicia representing a sleep state specified by the processor before transitioning to the processor specified sleep state; wherein the processor specified sleep state is one of a predefined plurality of sleep states, each distinct sleep state having associated therewith a distinct power usage state of the processor and a corresponding distinct wakeup protocol;

wherein the sleep wakeup logic retrieves the processor's sleep state indicia from the configuration register when determining whether execution of the processor wakeup procedure is required.

4. The power sequence controller of claim 3, including a sleep state mask for storing a mask value indicating which of the predefined plurality of sleep states require execution of the processor wakeup procedure to return the processor to the working state;

wherein the sleep wakeup logic compares the sleep state indicia retrieved from the configuration register with the sleep state mask to determine whether execution of the processor wakeup procedure is required.

5. The power sequence controller of claim 1, further including sleep wakeup logic for evaluating, when the processor is in a sleep state, the processor's sleep state so as to determine whether transitioning the processor from the current sleep state to the working state requires execution of a processor wakeup procedure to return the processor to the working state, and for storing a non-zero value associated with the wakeup event signal in the interrupt source register when the determination indicates that execution of the processor wakeup procedure is required;

wherein, the processor's sleep state is one of a predefined plurality of sleep states, each distinct sleep state having associated therewith a distinct power usage state of the processor and a corresponding distinct wakeup protocol; the predefined plurality of sleep states including at least one sleep state from which execution of an instruction stream in a previously defined context can be resumed without execution of the processor wakeup procedure and without execution of the interrupt handler procedure.

6. The power sequence controller of claim 1, further including:

processor reset logic for evaluating, when the processor is in a sleep state, the processor's sleep state so as to determine whether the processor must be reset in order to return the processor to the working state, and for generating a processor reset signal when (A) the intercepted wakeup event signal requires transitioning the processor to the working state, as determined by the wakeup logic, and (B) the determination by the processor reset logic indicates that a processor reset is required;

wherein the processor's sleep state is one of a predefined plurality of sleep states, each distinct sleep state having associated therewith a distinct power usage state of the processor and a corresponding distinct wakeup protocol; the predefined plurality of sleep states including at least one sleep state from which return to the working state requires said processor reset.

7. The power sequence controller of claim 6, including a configuration register for storing a sleep state indicia for the processor, the processor's sleep state indicia representing a sleep state specified by the processor before transitioning to the processor specified sleep state; wherein the processor specified sleep state is one of a predefined plurality of sleep states, each distinct sleep state having associated therewith a distinct power usage state of the processor and a corresponding distinct wakeup protocol;

wherein the processor reset logic retrieves the sleep state indicia from the configuration register when determining whether the processor must be reset.

8. The power sequence controller of claim 7, including a sleep state reset mask for storing a mask value indicating which of the predefined plurality of sleep states require the processor to be reset in order to return the processor to the working state;

wherein the processor reset logic compares the sleep state indicia retrieved from the configuration register with the sleep state reset mask to determine whether a processor reset is required.

9. A power management method for use in a device having a processor for executing instructions in an instruction stream, comprising the steps of:

storing a first wakeup mask indicating which of a predefined set of wakeup event signals are to be ignored and which require transitioning the processor from a sleep state to a working state;

storing a second wakeup indicating which of the predefined set of wakeup event signals require software processing;

comparing a wakeup event signal intercepted by a power sequence controller with the first wakeup mask and generating a processor wakeup signal when the comparison indicates that the intercepted wakeup event signal requires transitioning the processor to the working state; and determining whether the intercepted wakeup event signal requires software processing, and storing a non-zero value associated with the wakeup event signal in an interrupt source register when the determination indicates that software processing is required;

wherein the determining step includes comparing the intercepted wakeup event signal with the second wakeup mask to determine whether the intercepted wakeup event signal requires software processing;

the non-zero value in the interrupt source register causes the processor to execute an interrupt handler procedure and process the intercepted wakeup event; and when a processor wakeup signal is generated in response to the intercepted wakeup event signal and the determining step determines that the intercepted wakeup event does not require software processing, the processor transitions to a working state so as to resume execution of an instruction stream in a previously defined processor context without executing the interrupt handler procedure.

10. The power management method of claim 9, further including evaluating, when the processor is in a sleep state, the processor's sleep state so as to determine whether transitioning the processor from the current sleep state to the working state requires execution of a processor wakeup procedure to return the processor to the working state, and generating a processor interrupt signal when the determination indicates that execution of the processor wakeup procedure is required.

11. The power management method of claim 10, including storing a sleep state indicia for the processor, the processor's sleep state indicia representing a sleep state specified by the processor before transitioning to the processor specified sleep state; wherein the processor specified sleep state is one of a predefined plurality of sleep states, each distinct sleep state having associated therewith a distinct power usage state of the processor and a corresponding distinct wakeup protocol;

wherein the sleep state evaluating step includes retrieving the stored sleep state indicia when determining whether execution of the processor wakeup procedure is required.

12. The power management method of claim 11, including storing a sleep state mask value indicating which of the predefined plurality of sleep states require execution of the processor wakeup procedure to return the processor to the working state;

wherein the sleep state evaluating step compares the retrieved sleep state indicia with the sleep state mask to determine whether execution of the processor wakeup procedure is required.

13. The power management method of claim 9, further including:

evaluating, when the processor is in a sleep state, the processor's sleep state so as to determine whether transitioning the processor from the current sleep state to the working state requires execution of a processor wakeup procedure to return the processor to the working state, and storing a non-zero value associated with the wakeup event signal in the interrupt source register when the determination indicates that execution of the processor wakeup procedure is required;

wherein the processor's sleep state is one of a predefined plurality of sleep states, each distinct sleep state having associated therewith a distinct power usage state of the processor and a corresponding distinct wakeup protocol; the predefined plurality of sleep states including at least one sleep state from which execution of an instruction stream in a previously defined context can be resumed without execution of the processor wakeup procedure and without execution of the interrupt handler procedure.

14. The power management method of claim 9, further including:

evaluating, when the processor is in a sleep state, the processor's sleep state so as to determine whether the processor must be reset in order to return the processor to the working state, and generating a processor reset signal when (A) the intercepted wakeup event signal requires transitioning the processor to the working state, and (B) the determination by the sleep state evaluating step indicates that a processor reset is required;

wherein the processor's sleep state is one of a predefined plurality of sleep states, each distinct sleep state having associated therewith a distinct power usage state of the processor and a corresponding distinct wakeup protocol; the predefined plurality of sleep states including at least one sleep state from which return to the working state requires said processor reset.

15. The power management method of claim 14, including storing in a register a sleep state indicia for the processor, the processor's sleep state indicia representing a sleep state specified by the processor before transitioning to the processor specified sleep state;

wherein the sleep state evaluating step includes retrieving the stored sleep state indicia when determining whether the processor must be reset.

16. The power management method of claim 15, including storing a sleep state reset mask value indicating which of the predefined plurality of sleep states require the processor to be reset in order to return the processor to the working state;

wherein the sleep state evaluating step compares the retrieved sleep state indicia with the sleep state reset mask to determine whether said processor reset is required.

* * * * *

UNITED STATES PATENT AND TRADEMARK OFFICE
CERTIFICATE OF CORRECTION

PATENT NO. : 5,878,264
DATED : Mar. 2, 1999
INVENTOR(S) : Ebrahim

It is certified that error appears in the above-indentified patent and that said Letters Patent is hereby corrected as shown below:

Column 5, line 5, delete "(";

Column 5, line 6, delete "6" and insert --64--;

Column 8, line 42, delete "1182" and insert --182--;

Column 11, line 49, place a "." after operation;

Column 12, line 3, delete "}" and insert --)--;

Column 12, line 15, delete "gates" and insert --gate--;

Column 13, line 10, delete "In alternate" and insert --In an alternative--;

Column 13, line 23, delete "is" and insert --it--;

Column 14, line 26, delete "handier" and insert --handler--.

Signed and Sealed this

Twenty-seventh Day of July, 1999

*Attest:*

Q. TODD DICKINSON

*Attesting Officer*     *Acting Commissioner of Patents and Trademarks*